United States Patent
Nainar et al.

(10) Patent No.: US 11,818,142 B2
(45) Date of Patent: Nov. 14, 2023

(54) DISTRIBUTED DATA AUTHENTICATION AND VALIDATION USING BLOCKCHAIN

(71) Applicant: Cisco Technology, Inc., San Jose, CA (US)

(72) Inventors: Nagendra Kumar Nainar, San Jose, CA (US); Carlos M. Pignataro, Cary, NC (US); Luca Muscariello, Paris (FR); Alberto Compagno, Clamart (FR); Giovanna Carofiglio, Paris (FR)

(73) Assignee: CISCO TECHNOLOGY, INC., San Jose, CA (US)

( * ) Notice: Subject to any disclaimer, the term of this patent is extended or adjusted under 35 U.S.C. 154(b) by 185 days.

(21) Appl. No.: 17/410,286

(22) Filed: Aug. 24, 2021

(65) Prior Publication Data

US 2021/0385231 A1 Dec. 9, 2021

Related U.S. Application Data

(62) Division of application No. 16/118,699, filed on Aug. 31, 2018, now Pat. No. 11,140,177.

(51) Int. Cl.
*H04L 9/40* (2022.01)
*H04L 9/30* (2006.01)
(Continued)

(52) U.S. Cl.
CPC .............. *H04L 63/126* (2013.01); *H04L 9/30* (2013.01); *H04L 9/3247* (2013.01);
(Continued)

(58) Field of Classification Search
CPC ....... H04L 63/126; H04L 9/30; H04L 9/3247; H04L 61/4511; H04L 61/5007;
(Continued)

(56) References Cited

U.S. PATENT DOCUMENTS

| 10,009,181 B2* | 6/2018 | Kaliski, Jr. ............. H04L 67/01 |
| 2010/0135296 A1* | 6/2010 | Hwang ............... H04L 12/1836 370/390 |

(Continued)

OTHER PUBLICATIONS

Lou, et al., "A Blockchain-based key Management Scheme for Named Data Networking," 2018 1st IEEE International Conference on Hot Information-Centric Networking (HotICN), Aug. 2018, 6 pages.

(Continued)

*Primary Examiner* — J. Brant Murphy

(57) ABSTRACT

An electronic device of a content producer generates a chunk of data, associates a location-independent name with the chunk of data, generates a signature for the chunk of data, attaches the signature to the chunk of data, and transmits the chunk of data, with the signature attached, to one or more user devices in response to respective requests. The signature is generated based on the data in the chunk, using a private key of the electronic device. The electronic device also stores information, including a specification of a public key associated with the private key, in a first ledger entry of a blockchain, to provide the one or more user devices with access to the public key. A user device may obtain the public key and use it to verify the chunk of data.

20 Claims, 8 Drawing Sheets

(51) Int. Cl.
  *H04L 9/32* (2006.01)
  *H04L 61/4511* (2022.01)
  *H04L 61/5007* (2022.01)
  *H04L 9/00* (2022.01)

(52) U.S. Cl.
  CPC ...... *H04L 61/4511* (2022.05); *H04L 61/5007* (2022.05); *H04L 9/50* (2022.05)

(58) Field of Classification Search
  CPC ..... H04L 9/50; H04L 9/3263; H04L 63/0823; G06F 21/64
  See application file for complete search history.

(56) References Cited

U.S. PATENT DOCUMENTS

| | | | | |
|---|---|---|---|---|
| 2013/0061049 | A1* | 3/2013 | Irvine | G06F 21/6218 713/165 |
| 2016/0328713 | A1* | 11/2016 | Ebrahimi | G06F 21/34 |
| 2017/0324711 | A1* | 11/2017 | Feeney | H04L 63/0428 |
| 2018/0032383 | A1* | 2/2018 | Surcouf | G06F 21/602 |
| 2018/0205537 | A1* | 7/2018 | Wilson | H04L 9/30 |
| 2019/0007205 | A1* | 1/2019 | Corduan | H04L 63/062 |
| 2019/0026146 | A1* | 1/2019 | Peffers | G06F 9/5044 |
| 2019/0238550 | A1* | 8/2019 | Zhang | H04L 63/105 |
| 2019/0288854 | A1* | 9/2019 | Xie | H04L 9/0891 |

OTHER PUBLICATIONS

Zhang, et al., "Name Data Networking," ACM SIGCOMM Computer Communication Review, vol. 44, No. 3, Jul. 2014, 8 pages.

Bian, et al., "Deploying Key Management on NDN Testbed," NON Technical Report NDN-0009, Revision 2, Feb. 2013, 4 pages.

Matsumoto, et al., "IKP: Turning a PKI Around with Blockchains," https://eprint.iacr.org/2016/1018.pdf, Oct. 2016, 34 pages.

Sara Cicero, CISCO, "Verizon Completes Successful Test of Cisco's Hybrid Information-Centric Networking in its Network," https://newsroom.cisco.com/press-release-content?type=webcontent&articleID=1916869, Mar. 16, 2018, 8 pages.

Cooney, "Cisco, Verizon take Information-Centric Networking for a real-world spin," https://www.networkworld.com/article/3264650/cisco-verizon-take-information-centric-networking-for-a-real-world-spin.html, Mar. 22, 2018, 10 pages.

Chirgwin, "Cisco's 'Hybrid Information-Centric Networking' gets a workout at Verizon," https://www.theregister.co.uk/2018/03/20/cisco_verizon_hybrid_information_centric_networking/, Mar. 20, 2018, 6 pages.

Ion, et al., "Toward Content-Centric Privacy in ICN: Attribute-based Encryption and Routing," SIGCOMM'13, Aug. 2013, 2 pages.

Yu, et al., "NDN DeLorean: An Authentication System for Data Archives in Named Data Networking," ICN'17, Sep. 2017, 11 pages.

Fotiou, et al., "Decentralized Name-based Security for Content Distribution using Blockchains," 2016 IEEE Conference on Computer Communications Workshops (INFOCOM WKSHPS), Apr. 2016, 6 pages.

International Search Report and Written Opinion in counterpart International Application No. PCT/US2019/047832, dated Nov. 15, 2019, 14 pages.

* cited by examiner 200 (Continued)

↓

Generate a second signature for the chunk, based on the data in the chunk, using a second private key of the electronic device. (228)

Generate the second signature in response to a determination that the first private key has been compromised. (230)

↓

Attach the second signature to the chunk of data. (232)

↓

Assign a second network address to the chunk of data as signed with the second signature. (234)

↓

Transmit the chunk of data, with the second signature attached, to one or more user devices in response to respective requests. (236)

↓

Store information, including a specification of a second public key associated with the second private key, in a second ledger entry of the blockchain, to provide access to the second public key. The second ledger entry of the blockchain is more recent than the first ledger entry. (238)

Assign a second transaction ID as an index to the second entry ledger. (240)

↓

Store the second transaction ID in association with the location-independent name and the second network address in the name-resolution server system. (242)

Figure 2B

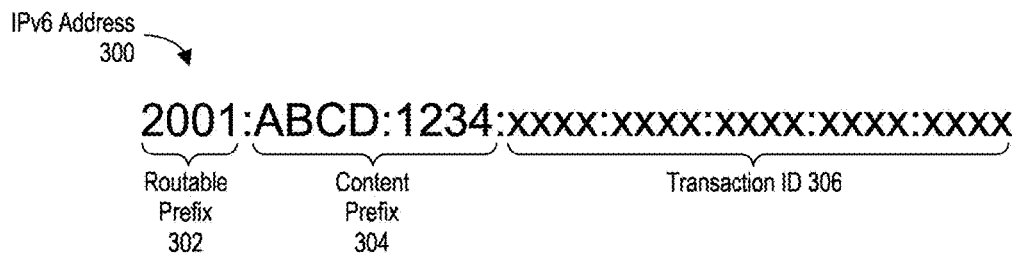
Figure 3A
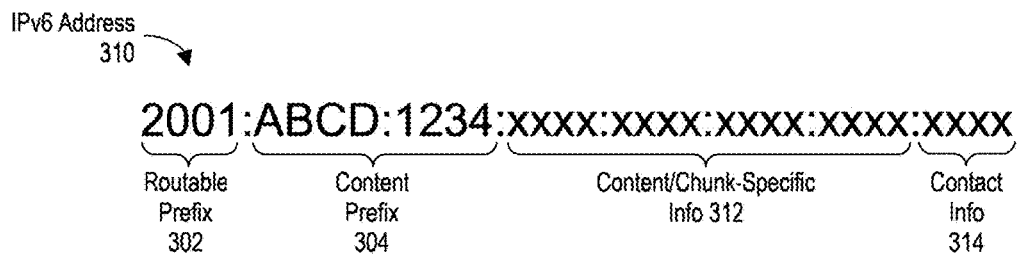
Figure 3B
| Blockchain Ledger 402 | | |
|---|---|---|
| Chunk 404 | Key Info 406 | TID 408 |
| 410-1 Data1 | Key = Key1<br>Version = 1<br>Validity = 1 year<br>Producer = Prod1 | 1234 |
| 410-2 Data2 | ... | ... |
Figure 4A
| Name Resolution Table 500 | |
|---|---|
| Name 502 | IP Address 504 |
| 506-1 Data1 | 2001:ABCD:1234:1234 |
| 506-2 Data2 | ... |
Figure 5
| Blockchain Ledger 402 | | |
|---|---|---|
| Chunk 404 | Key Info 406 | TID 408 |
| 410-1 Data1 | Key = Key1<br>Version = 1<br>Validity = 1 year<br>Producer = Prod1 | 1234 |
| 410-2 Data2 | ... | ... |
| 410-3 Data3 | ... | ... |
| 410-4 Data1 | Key = Key1<br>Version = 2<br>Validity = 1 year<br>Producer = Prod1 | 2345 |
Figure 4B

DISTRIBUTED DATA AUTHENTICATION AND VALIDATION USING BLOCKCHAIN

CROSS-REFERENCE TO RELATED APPLICATION

This application is a Divisional Application of U.S. patent application Ser. No. 16/118,699 filed on Aug. 31, 2018, the content of which is hereby incorporated by reference in its entirety for all purposes.

TECHNICAL FIELD

The present disclosure generally relates to authenticating and validating data provided to user devices, and in particular, to using a blockchain to store information relating to public keys used to authenticate and validate data.

BACKGROUND

Digital signatures may be used to ensure end-to-end integrity for data communications. For example, a content producer uses a private key to generate a signature for a chunk of data (e.g., in a packet), based at least in part on the data in the chunk. The signature may be attached to the chunk (e.g., added to the packet), which is transmitted to a user device. The user device verifies (e.g., authenticates and validates) the data in the packet using the signature and a public key that corresponds to the private key of the content producer. If the data has been modified during transmission of the packet, or does not actually originate from the content producer, the verification will fail, assuming the private key remains secure.

Such a technique may be used in Information-Centric Networking (ICN) and hybrid ICN (hICN). For example, the public key for a chunk of data is carried in the packet for a preceding chunk of data. If such a public key is cached at an intermediate network node between the content producer and user device, however, then the public key may become obsolete. Also, when a public key is distributed in this manner, the content producer cannot change the public key in real time.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

FIGS. 2A and 2B show a flowchart illustrating a method performed at an electronic device of a content producer in accordance with some implementations.

FIGS. 3A and 3B illustrate IPv6 addresses for chunks of data in accordance with some implementations.

FIGS. 4A and 4B illustrate a blockchain ledger in accordance with some implementations.

FIG. 5 illustrates a name-resolution table in accordance with some implementations.

Figure 1:
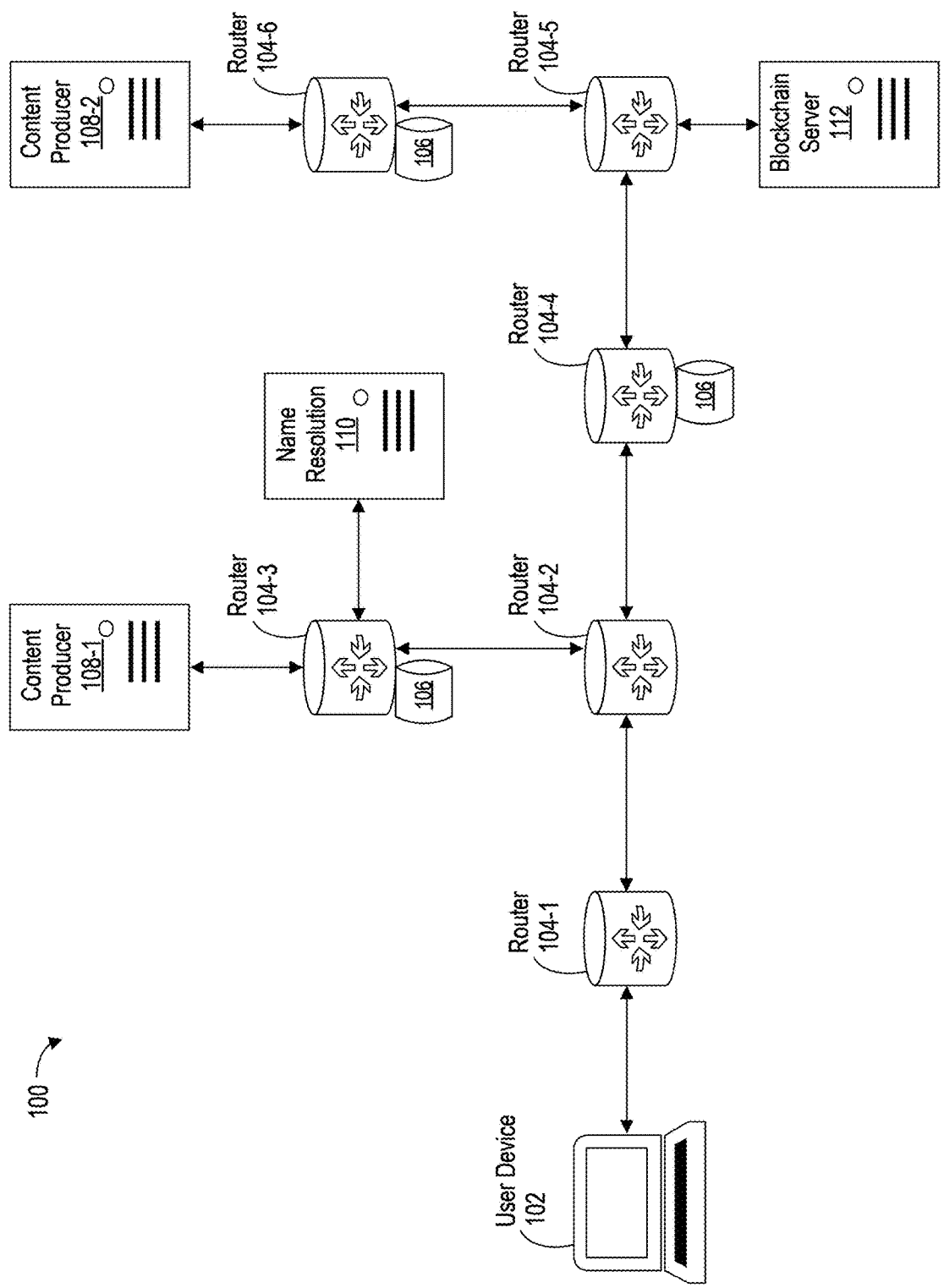
FIG. 1 is a block diagram illustrating a network architecture in accordance with some implementations.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DESCRIPTION OF EXAMPLE EMBODIMENTS

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices and circuits have not been described in exhaustive detail so as not to obscure more pertinent aspects of the example implementations described herein.

OVERVIEW

In some implementations disclosed herein, an electronic device of a content producer generates a chunk of data, associates a location-independent name with the chunk of data, generates a signature for the chunk of data, attaches the signature to the chunk of data, and transmits the chunk of data, with the signature attached, to one or more user devices in response to respective requests. The signature is generated based at least in part on the data in the chunk, using a private key of the electronic device. The electronic device also stores information, including a specification of a public key associated with the private key, in a first ledger entry of a blockchain, to provide the one or more user devices with access to the public key.

In other implementations disclosed herein, a user device performs a first lookup to obtain a network address for a chunk of data that contains at least a portion of requested content. The first lookup is based on a location-independent name associated with the chunk of data. The user device transmits a request for the chunk of data, wherein the request specifies the network address, and receives the chunk of data in response to the request. The chunk of data is signed with a signature generated based on the data in the chunk using a private key of a producer of the content. The user device performs a second lookup to obtain a public key associated with the private key. Performing the second lookup includes accessing a ledger entry in a blockchain. The user device verifies the chunk of data using the public key and, in response to verifying the chunk of data, allows an application running on the user device to use the data in the chunk.

EXAMPLE EMBODIMENTS

FIG. 1 is a block diagram illustrating a network architecture 100 in accordance with some implementations. In the network architecture 100, one or more user devices 102 (a single user device 102 is shown for simplicity) are communicatively coupled to content producers 108-1 and 108-2 through one or more networks that include a plurality of routers 104-1 through 104-6. Examples of the user device 102 include, without limitation, a mobile electronic device (e.g., mobile phone), wearable computing device, laptop computer, tablet computer, desktop computer, or another electronic device. The content producers 108-1 and 108-2 are electronic devices (e.g., server systems, Internet-of-Things devices, user devices of users who post content, and/or other electronic devices that publish content) that produce chunks of data containing content (e.g., content requested by user devices 102). The routers 104 also communicatively couple the user device 102 and the content producers 108 with a name-resolution server 110 and a blockchain server 112. In some implementations, the name-resolution server 110 is a Domain-Name-System (DNS) server system that stores a DNS registry used to map names of content chunks to corresponding network addresses, such as Internet Protocol (IP) addresses (e.g., 128-bit IP version 6 (IPv6) addresses). The blockchain server 112 may be any server system that stores a copy of a blockchain with ledger entries that specify public keys to be used to verify chunks of data from the content producers 108-1 and 108-2. While FIG. 1 shows six routers 104, different numbers and configurations of routers 104 and other network devices (e.g., proxy servers, firewalls, switches, hubs, etc.) may be used in the network architecture 100. Each server system in the network architecture 100 may be a single server computer or multiple server computers (e.g., multiple computing devices working together to perform the actions of a server system, such as for cloud computing).

The user device 102 runs one or more applications that use content from a content producer 108. To obtain the content, the user device 102 sends a packet to the content producer requesting the content and receives a data packet in response containing a chunk of data that includes at least a portion of the requested content. All or a portion of the routers 104 (e.g., routers 104-3, 104-4, and 104-6 in the example of FIG. 1) include memories 106 used to cache chunks of data and corresponding signatures. (Caching, as used herein, refers to storing chunks of data and corresponding signatures locally at a particular device and does not imply that the chunks are stored in any particular type of memory.) A respective router 104 may cache a particular chunk of data (e.g., a corresponding packet that also includes a signature) and, in response to a request from the user device 102 for that particular chunk, may service the request by transmitting the cached chunk (e.g., the packet) to the user device 102 without forwarding the request upstream to the content producer 108 that originally produced that particular chunk. The network architecture thus may implement Information-Centric Networking (ICN), if all of the routers 104 have memories 106 for caching chunks of data from the content producers 108, or hybrid ICN (hICN), if some but not all of the routers 104 have memories 106 for caching chunks of data from the content producers 108. Requests from the user device 102 may be ICN/hICN interests.

Figure 2A:
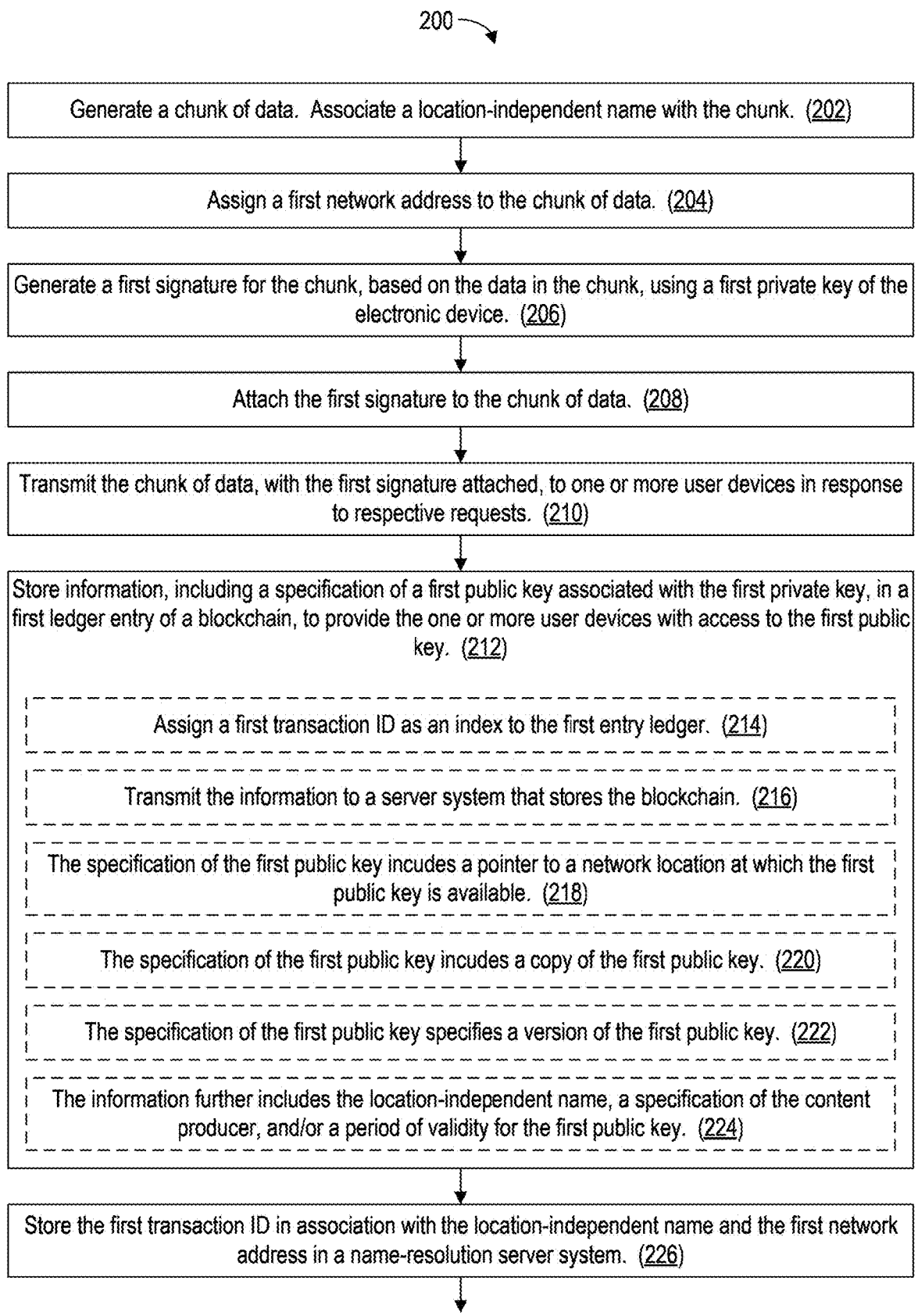

FIGS. 2A and 2B show a flowchart illustrating a method 200 performed at an electronic device of a content producer (e.g., content producer 108-1 or 108-2, FIG. 1) in accordance with some implementations. The method 200 is described with reference to FIGS. 3A and 3B, which illustrate examples of IPv6 addresses 300 (FIG. 3A) and 310 (FIG. 3B) for chunks of data; FIGS. 4A and 4B, which illustrate examples of a blockchain ledger 402; and FIG. 5, which illustrates a name-resolution table 500 (e.g., in a DNS registry). A copy of the blockchain ledger 402 may be stored in the blockchain server 112 (FIG. 1). The name-resolution table 500 may be stored in the name-resolution server 110 (FIG. 1).

In the method 200, a chunk of data is generated (202, FIG. 2A) and a location-independent name is associated with the chunk. The location-independent name may be independent of any network location at which the chunk of data is available and may have been provisioned by the electronic device of the content producer. The location-independent name may be an application-level name (e.g., usable by an application 920, FIG. 9). The chunk may be generated in response to a request for the data (e.g., an ICN/hICN interest) from a user device 102 (FIG. 1). For example, the data is packaged into the chunk in accordance with a specified protocol (e.g., as specified in the request received from a user device 102). A first network address (e.g., an IPv6 address, such as IPv6 address 300 or 310, FIGS. 3A-3B) is assigned (204) to the chunk of data.

A first signature is generated (206) for the chunk, based at least in part on the data in the chunk, using a first private key of the electronic device. The first signature may be based further on other data associated with the chunk (e.g., including the first transaction ID of step 214, below), such as other data included in a packet that includes the chunk. The first signature is attached (208) to the chunk of data. For example, the first signature is included in the packet that includes the chunk.

The chunk of data, with the first signature attached, is transmitted (210) to one or more user devices in response to respective requests. For example, the packet that includes the chunk and the first signature is transmitted from the content producer 108-1 or 108-2 to a user device 102 (FIG. 1). A router 104 or other network device involved in transmitting the packet may cache the chunk and first signature in its memory 106 (FIG. 1).

Information, including a specification of a first public key associated with the first private key, is stored (212) in a first ledger entry of a blockchain, to provide the one or more user devices with access to the first public key. In some implementations, a first transaction ID is assigned (214) as an index to the first entry ledger. In some implementations, storing the information in the first ledger entry of a blockchain includes transmitting (216) the information to a server system (e.g., blockchain server 112, FIG. 1) that stores the blockchain.

The first transaction ID may be included in the first network address. For example, the IPv6 address 300 (FIG. 3A) includes a transaction ID 306 as well as a routable prefix 302 and content prefix 304 for the chunk of data. Alternatively, the first transaction ID is separate from the first network address. For example, the IPv6 address 310 (FIG. 3B) includes the routable prefix 302, the content prefix 304, content/chunk-specific information 312, and contact information 314 (e.g., specifying a point of contact such as a content producer or block chain), but does not include the transaction ID. The routable prefix 302 and content prefix 304 together may form all or a portion of the name of the chunk.

In some implementations, the specification of the first public key, as stored in the first ledger entry of the blockchain, incudes (218) a pointer to a network location at which the first public key is available. The electronic device may store the first public key in the network location, such that it is available to user devices 102 that have accessed the first ledger entry of the blockchain and obtained the pointer. In other implementations, the specification of the first public key, as stored in the first ledger entry of the blockchain, incudes (220) a copy of the first public key. In some implementations, the specification of the first public key specifies (222) a version of the first public key. In some implementations, the information further includes (224) the location-independent name, a specification of the content producer, and/or a period of validity (i.e., a time to live) for the first public key. The first public key becomes invalid once the time to live has expired.

FIG. 4A illustrates a blockchain ledger 402 with entries 410. Each entry 410 includes a field 404 that stores the location-independent name of a chunk, a field 406 (or alternatively, a plurality of fields) that stores the information of step 212, and a field 408 that stores the transaction ID. In the example of FIG. 4A, a first entry 410-1 stores a name ('Data1') of a first chunk in field 404; a public key (Key 1'), a version of the public key ('1'), a period of validity ('1 year'), and a producer ('Prod1') in field 406, and a transaction ID ('1234') in field 408. A second entry 410-2 stores similar data for a second chunk, and so on.

The first transaction ID is stored (226) in association with the location-independent name and the first network address in a name-resolution server system. For example, the location-independent name, the first network address, and the first transaction ID are provided (i.e., transmitted) to a DNS registry at the name-resolution server system 110 (FIG. 1), where they are stored. The first transaction ID may be stored as part of the first network address (e.g., as for the IPv6 address 300, FIG. 3A) or as a separate item distinct from the first network address (e.g., as for the IPv6 address 310, FIG. 3B). FIG. 5 shows an example of a name resolution table 500 stored at the name-resolution server system 110 in accordance with some implementations. A first entry 506-1 stores the name ('Data 1') of the first chunk in a name field 502 and the IP address of the first chunk in an address field 504. (The IP address shown in the entry 506-1, which may be an IPv6 address, has been truncated for visual clarity). A second entry 506-2 stores similar information for the second chunk, and so on. In the example of FIG. 5, the IP addresses stored in fields 504 include respective transaction IDs (e.g., are IPv6 addresses 300, FIG. 3A). In another example, the table 500 may have another field for storing transaction IDs separately from the IP addresses (e.g., for IPv6 addresses 310, FIG. 3B).

In some implementations, after steps 210, 212, and 226 are performed, a second signature is generated (228, FIG. 2B) for the chunk, based on the data in the chunk, using a second private key of the electronic device. The second signature may be generated, for example, in response to a determination (230) that the first private key has been compromised. The second signature is attached (232) to the chunk of data (e.g., is included in a packet that includes the chunk), as described for step 208.

A second network address (e.g., an IPv6 address, such as IPv6 address 300 or 310, FIGS. 3A-3B) is assigned (234) to the chunk of data as signed with the second signature. The chunk of data is transmitted (236), with the second signature attached, to one or more user devices in response to respective requests. For example, a packet that includes the chunk and the second signature is transmitted from the content producer 108-1 or 108-2 to a user device 102 (FIG. 1). A router 104 or other network device involved in transmitting the packet may cache the chunk and second signature in its memory 106 (FIG. 1).

Information, including a specification of a second public key associated with the second private key, is stored (238) in a second ledger entry of the blockchain (e.g., as described for all or a portion of steps 212-224, FIG. 2A), to provide access to the second public key. The second ledger entry of the blockchain is more recent than the first ledger entry. In some implementations, a second transaction ID is assigned (240) as an index to the second entry ledger. For example, an entry 410-4 is added to the blockchain ledger 402 (FIG. 4B) that specifies version 2 of Key1 as the second public key. In this example, the entry 410-1 specifies version 1 of Key1 as the first public key, and the chunk of data has the name 'Data1'. In another example, the entry 410-4 could specify version 1 of Key2 as the second public key.

The second transaction ID is stored (242) in association with the location-independent name and the second network address in the name-resolution server system (e.g., as described for step 226). For example, the location-independent name, the second network address, and the second transaction ID are provided to the DNS registry stored at the name-resolution server system 110 (FIG. 1). The entry 506-1 may be updated to store the second network address and second transaction ID in association with the location-independent name.

Steps in the method 200 may be combined, broken out, and/or omitted. The sequence of the method 200 may be modified for steps that are not order-dependent.

Figure 6:
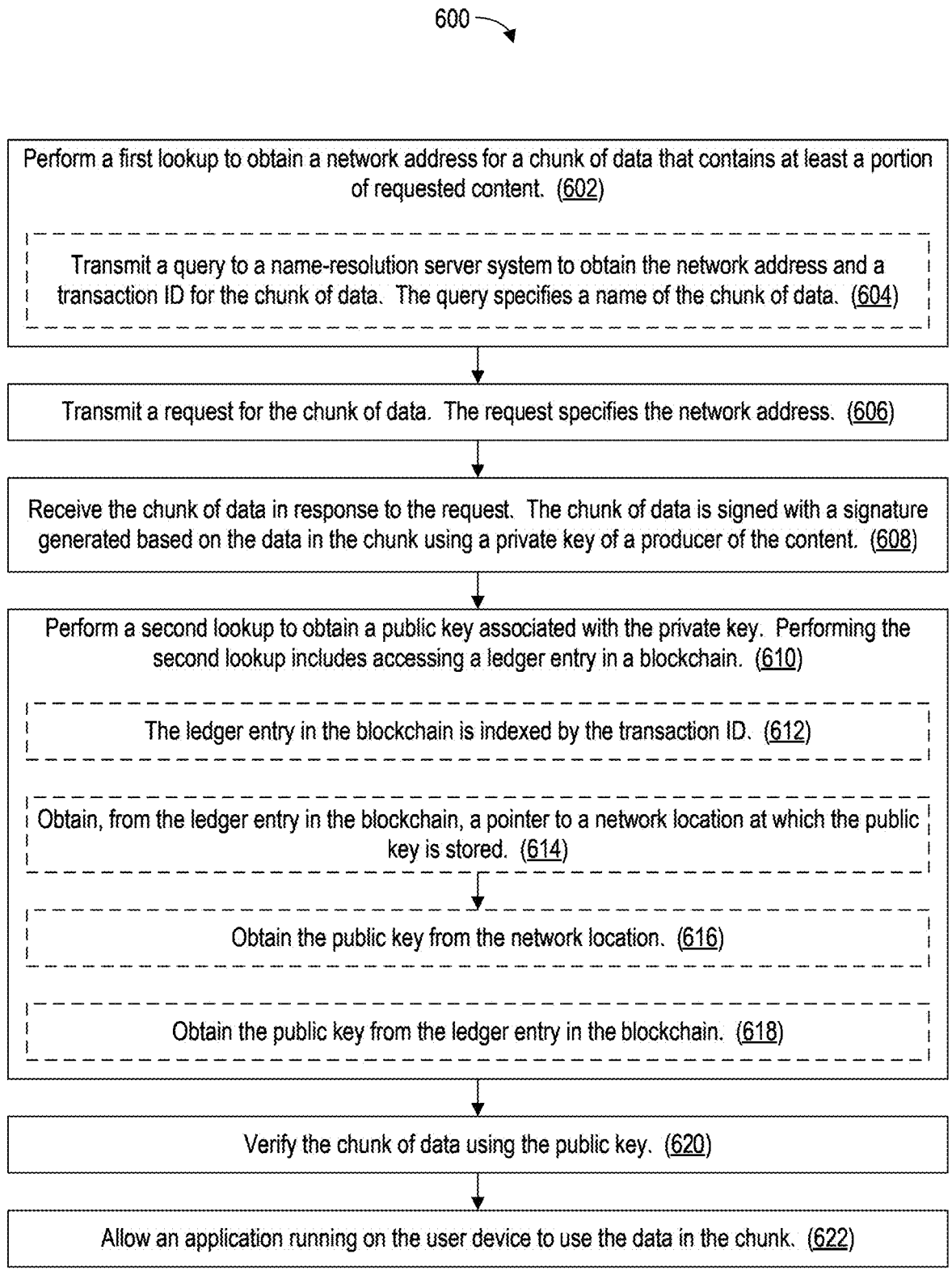
FIGS. 6 and 7 show flowcharts illustrating methods performed at a user device in accordance with some implementations.
Figure 7:
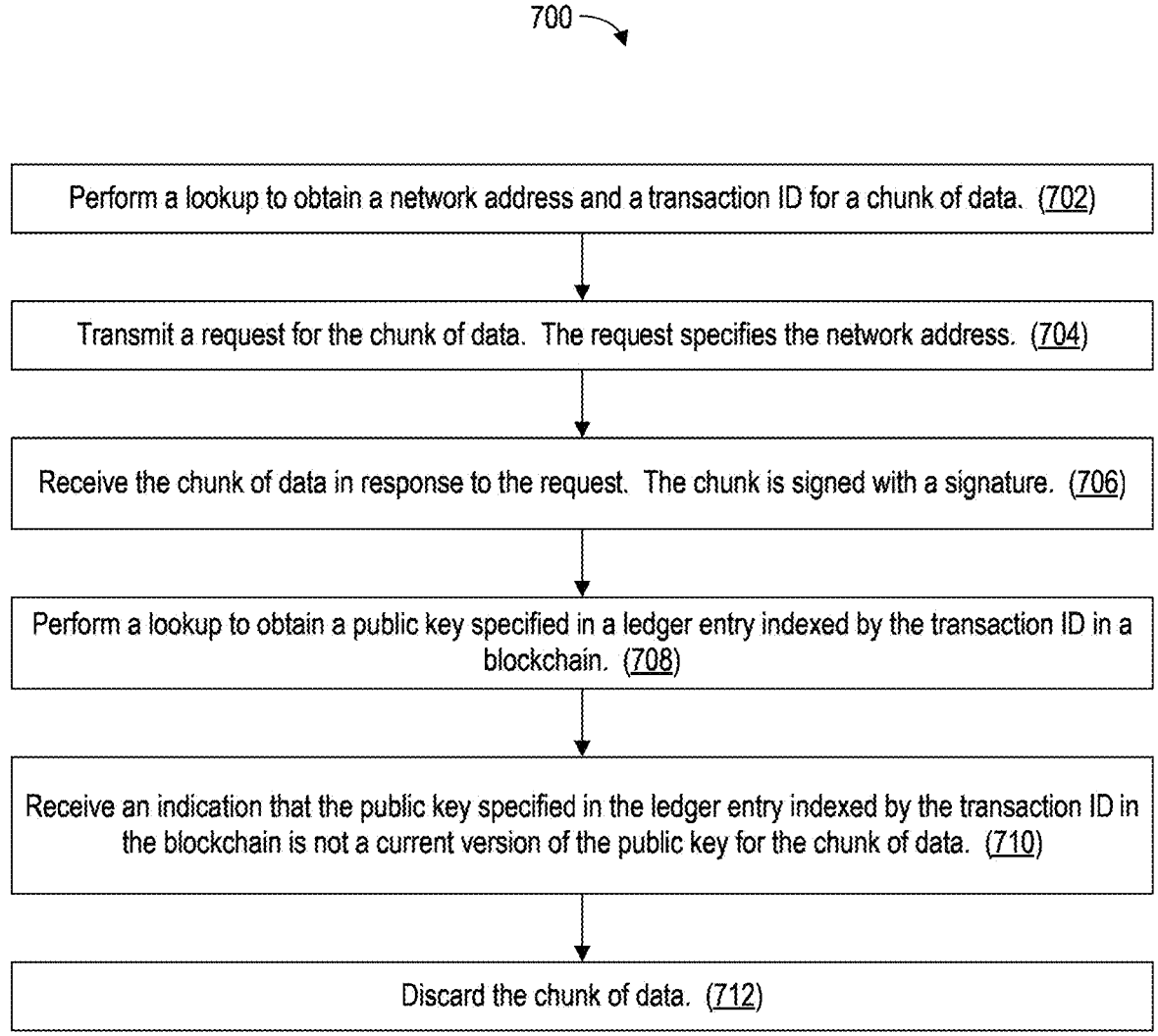

FIGS. 6 and 7 show flowcharts illustrating methods 600 and 700 performed at a user device (e.g., user device 102, FIG. 1) in accordance with some implementations. The methods 600 and 700 are described with reference to FIGS. 3A-3B, 4A-4B, and 5.

In the method 600, a first lookup is performed (602) to obtain a network address (e.g., an IPv6 address, such as IPv6 address 300 or 310, FIGS. 3A-3B) for a chunk of data that contains at least a portion of requested content. The first lookup is based on a location-independent name associated with the chunk of data. The first lookup may be performed in response to a request for the content from an application 920 (FIG. 9) running on the user device. In some implementations, a query is transmitted (604) to a name-resolution server system 110 (FIG. 1) (e.g., to a DNS registry) to obtain the network address and a transaction ID for the chunk of data. The query specifies the location-independent name associated with the chunk of data. The transaction ID may be returned as part of the network address (e.g., for an IPv6 address 300, FIG. 3A) or as a separate item (e.g., for an IPv6 address 310, FIG. 3B).

A request for the chunk of data is transmitted (606) that specifies the network address. The chunk of data is received (608) in response to the request. The chunk of data is signed with a signature generated based on the data in the chunk using a private key of a producer of the content (e.g., as described for steps 206 and 228 of the method 200, FIGS. 2A-2B).

A second lookup is performed (610) to obtain a public key associated with the private key. Performing the second lookup includes accessing a ledger entry (e.g., entry 410-1, FIG. 4A; entry 410-4, FIG. 4B) in a blockchain. The ledger entry in the blockchain may be indexed (612) by the transaction ID (e.g., as shown in FIGS. 4A and 4B).

In some implementations, a pointer to a network location at which the public key is stored is obtained (614) from the ledger entry in the blockchain (e.g., in accordance with step 218, FIG. 2A). The public key is then obtained (616) from the network location. In other implementations, the public key is obtained (618) from the ledger entry in the blockchain (e.g., in accordance with step 220, FIG. 2A).

The chunk of data is verified (620) using the public key. In response to successful verification of the chunk of data, an application running on the user device is allowed (622) to use the data in the chunk. If the chunk of data had been modified since being generated or had been signed with a private key that does not correspond to the public key, then the verification would have failed, indicating that the chunk cannot be authenticated and validated.

In the method 600, the successful verification of the chunk of data using the public key in step 620 indicates that the public key corresponds to the private key that the content producer used to generate the signature for the chunk of data (and also that the chunk has not been modified). However, after using the private key to generate the signature, the content producer may decide to invalidate that private key and use a new private key to re-sign the chunk of data, as described for example in steps 228-242 of the method 200 (FIG. 2B). Invalidating the private key effectively invalidates the associated public key. The method 700 (FIG. 7) illustrates how the use of a blockchain allows the user device to be notified that a public key has been invalidated and that a new public key is thus needed. The method 700 may be performed in conjunction with the method 600 (FIG. 6). For example, a user device 102 (FIG. 1) may perform the method 600 for a first chunk of data and the method 700 for a second chunk of data.

In the method 700, a lookup is performed (702) to obtain a network address (e.g., an IPv6 address, such as IPv6 address 300 or 310, FIGS. 3A-3B) and a transaction ID for a chunk of data (e.g., as described for the step 602, FIG. 6). Once the network address is obtained, a request for the chunk of data is transmitted (704) from the user device. The request specifies the network address (e.g., as described for the step 606, FIG. 6).

The chunk of data is received (706) in response to the request. The chunk is signed with a signature (e.g., as described for the step 608, FIG. 6).

A lookup is performed (708) to obtain a public key specified in a ledger entry indexed by the transaction ID in a blockchain (e.g., as described for the steps 610 and 612, FIG. 6). In response, an indication is received (710) (e.g., from the blockchain server 112, FIG. 1) that the public key specified in the ledger entry indexed by the transaction ID in the blockchain is not a current version of the public key for the chunk of data. In the example of FIG. 4B, if the transaction ID is '1234,' which indexes ledger entry 410-1, then the lookup results in receiving an indication that the public key of ledger entry 410-1 is not the current version of the public key for chunk 'Data 1'. As FIG. 4B shows, the current version of the public key for chunk 'Data 1' is specified in ledger entry 410-4, which is indexed by transaction ID '2345'. Step 710 may occur because the name resolution server 110 (e.g., the name resolution table 500, FIG. 5) has not been updated or has been hacked.

Because the public key obtained in step 708 is not the current public key corresponding to the content producer's private key, the chunk of data cannot be properly authenticated and validated. The chunk of data is therefore discarded (712). The method 600 or 700 may subsequently be performed in an attempt to obtain the properly signed chunk of data.

Steps in the methods 600 and 700 may be combined, broken out, and/or omitted. The sequences of the methods 600 and 700 may be modified for steps that are not order-dependent.

The methods 200, 600, and 700 thus provide efficient and secure techniques for using digital signatures to protect content. The methods allow content producers to make public keys available to consumers and to change the keys being used in real time. Consumers can use the blockchain to determine whether a public key is up-to-date. A determination that a public key is not up-to-date can be made without attempting to verify a chunk of data, thus saving processing power.

Figure 8:
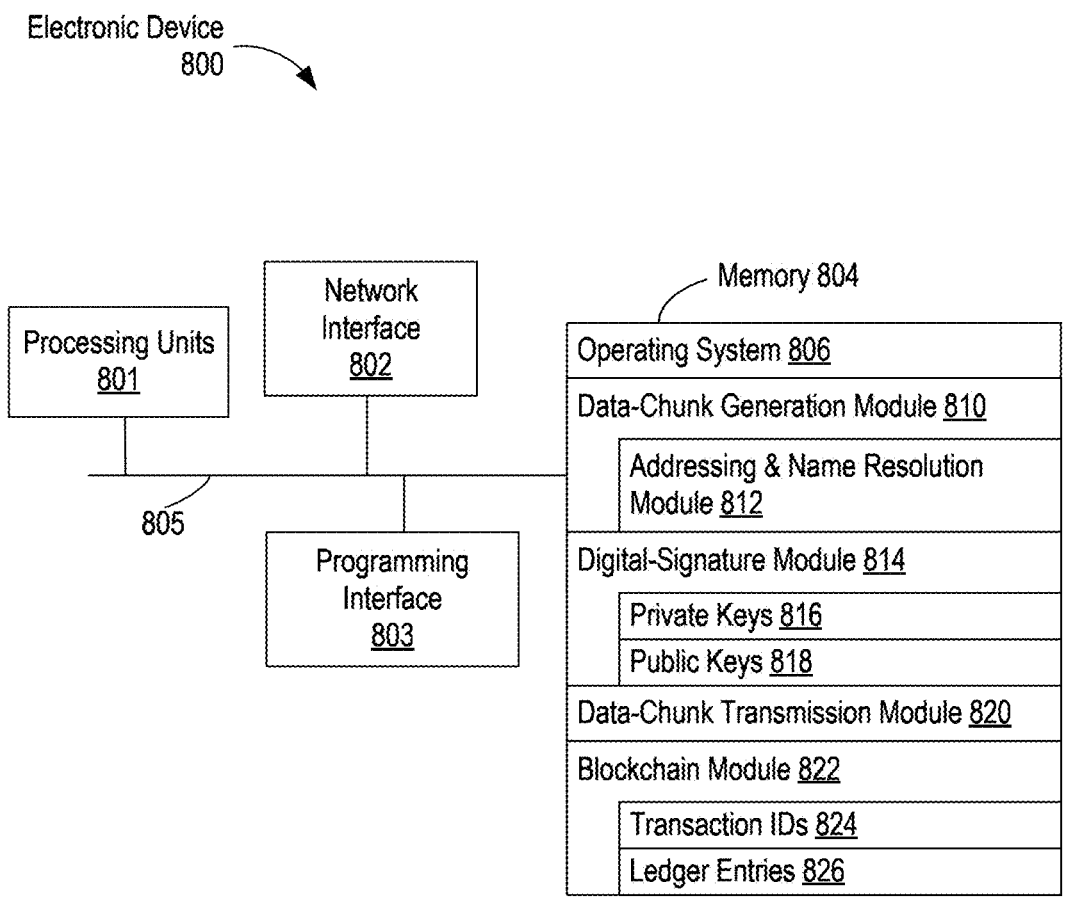
FIG. 8 is a block diagram of an electronic device of a content producer in accordance with some implementations.

FIG. 8 is a block diagram of an electronic device 800 (e.g., content producer 108-1 or 108-2, FIG. 1) according to some implementations. While certain features are illustrated, those of ordinary skill in the art will appreciate from the present disclosure that various other features have not been illustrated for the sake of brevity, and so as not to obscure more pertinent aspects of the implementations disclosed herein. To that end, in some implementations the electronic device 800 includes one or more processing units (e.g., CPUs) 801, a network interface 802, a programming interface 803, memory 804, and one or more communication buses 805 for interconnecting these and various other components.

In some implementations, the memory 804 or a non-transitory computer-readable storage medium of the memory 804 stores the following programs, modules, and data structures, or a subset thereof: an optional operating system 806, a data-chunk generation module 810, a digital-signature module 814, a data-chunk transmission module 820, and a blockchain module 822. The operating system 806 includes procedures for handling various basic system services and for performing hardware-dependent tasks. The data-chunk generation module 810 includes an addressing and name-resolution module 812. The digital-signature module 814, which generates signatures for chunks of data, includes private keys 816 and corresponding public keys 818. The blockchain module 822, which manages interactions with a blockchain (e.g., the blockchain ledger 402, FIGS. 4A-4B), includes transaction IDs 824 and ledger entries 826 (e.g., entries to be stored in the blockchain ledger 402). The memory 804 or a non-transitory computer-readable storage medium of the memory 804 thus may include instructions for performing the method 200 (FIGS. 2A-2B).

Figure 9:
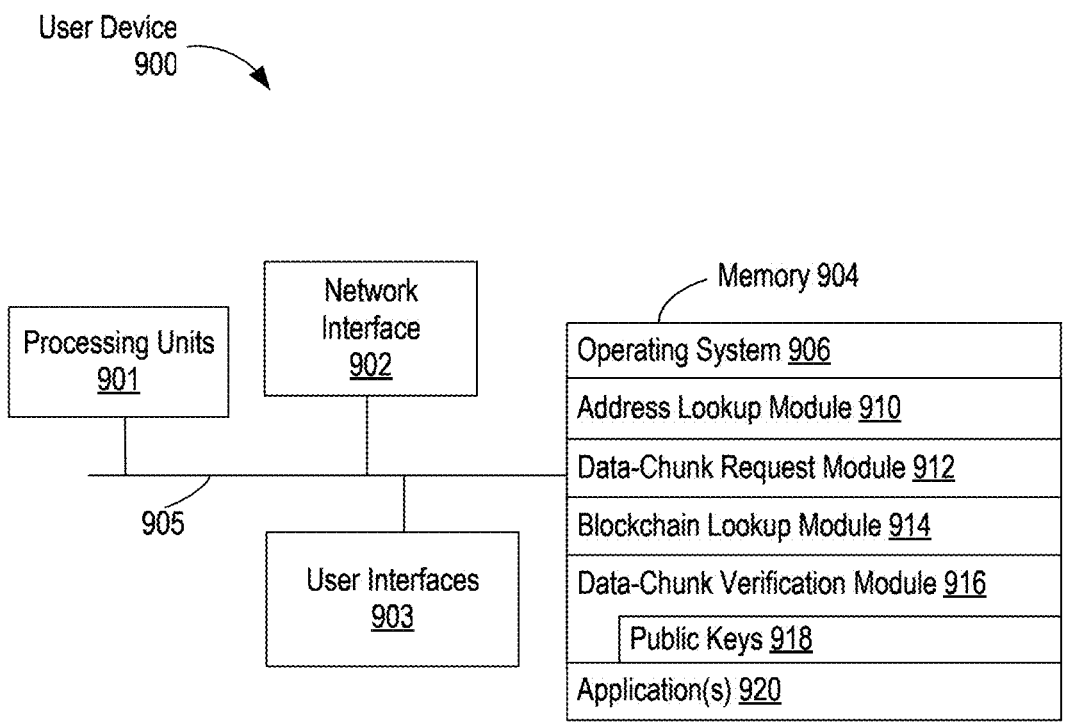
FIG. 9 is a block diagram of a user device in accordance with some implementations.

FIG. 9 is a block diagram of a user device 900 (e.g., user device 102, FIG. 1) according to some implementations. While certain features are illustrated, those of ordinary skill in the art will appreciate from the present disclosure that various other features have not been illustrated for the sake of brevity, and so as not to obscure more pertinent aspects of the implementations disclosed herein. To that end, in some implementations the user device 900 includes one or more processing units (e.g., CPUs) 901, a network interface 902, user interfaces 903 (e.g., for receiving user input; for displaying and/or playing content), memory 904, and one or more communication buses 905 for interconnecting these and various other components.

In some implementations, the memory 904 or the non-transitory computer-readable storage medium of the memory 904 stores the following programs, modules, and data structures, or a subset thereof: an operating system 906, an address lookup module 910, a data-chunk request module 912, a blockchain lookup module 914, a data-chunk verification module 916, and one or more applications 920. The operating system 906 includes procedures for handling various basic system services and for performing hardware-dependent tasks. The data-chunk verification module 916 includes public keys 918 obtained by the blockchain lookup module 914. The memory 904 or a non-transitory computer-readable storage medium of the memory 904 thus may include instructions for performing the methods 600 and/or 700 (FIGS. 6-7). An application 920 may use (e.g., display and/or play) content that is obtained through the method 600.

While various aspects of implementations within the scope of the appended claims are described above, it should be apparent that the various features of implementations described above may be embodied in a wide variety of forms and that any specific structure and/or function described above is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

It will also be understood that, although the terms "first," "second," etc. may be used herein to describe various elements, these elements should not be limited by these terms. These terms are only used to distinguish one element from another. For example, a first signature could be termed a second signature, and, similarly, a second signature could be termed a first signature, without changing the meaning of the description, so long as all occurrences of the first signature are renamed consistently and all occurrences of the second signature are renamed consistently. The first signature and the second signature are both signatures, but they are not the same signature.

The terminology used herein is for the purpose of describing particular embodiments only and is not intended to be limiting of the claims. As used in the description of the embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is truer]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

What is claimed is:

1. A method comprising, at a user device:
    performing a first lookup to obtain a network address for a chunk of data that contains at least a portion of requested content, the first lookup being based on a location-independent name associated with the chunk of data;
    transmitting a request for the chunk of data, wherein the request specifies the network address;
    receiving the chunk of data in response to the request, wherein the chunk of data is signed with a signature generated based on data in the chunk of data using a private key of a producer of the requested content;
    performing a second lookup to obtain a public key associated with the private key, comprising accessing a ledger entry in a blockchain;
    verifying the chunk of data using the public key; and
    in response to verifying the chunk of data, allowing an application running on the user device to use the data in the chunk of data.

2. The method of claim 1, wherein performing the second lookup comprises obtaining the public key from the ledger entry in the blockchain.

3. The method of claim 1, wherein performing the second lookup comprises:
    obtaining, from the ledger entry in the blockchain, a pointer to a network location at which the public key is stored; and
    obtaining the public key from the network location.

4. The method of claim 1, wherein:
    performing the first lookup comprises transmitting a query to a name-resolution server system to obtain the network address and a transaction ID for the chunk of data,
    the query specifies the location-independent name associated with the chunk of data, and
    the ledger entry in the blockchain is indexed by the transaction ID.

5. The method of claim 4, wherein:
    the network address is an IPv6 address,
    the name-resolution server system stores a DNS registry, and
    performing the first lookup comprises querying the DNS registry.

6. The method of claim 4, wherein the chunk of data is a first chunk, the network address is a first network address, the transaction ID is a first transaction ID, and the signature is a first signature, the method further comprising, at the user device:
    performing a third lookup to obtain a second network address and a second transaction ID for a second chunk of data;
    transmitting a request for the second chunk of data, wherein the request for the second chunk specifies the second network address;
    receiving the second chunk of data in response to the request, wherein the second chunk is signed with a second signature;
    performing a fourth lookup to obtain a public key specified in a ledger entry indexed by the second transaction ID in the blockchain;
    receiving an indication that the public key specified in the ledger entry indexed by the second transaction ID in the blockchain is not a current version of the public key for the second chunk of data; and
    in response to receiving the indication, discarding the second chunk of data.

7. The method of claim 1, wherein the ledger entry, in the blockchain, includes a specification of the public key associated with the private key.

8. A non-transitory computer-readable storage medium storing one or more programs configured for execution by a user device, the one or more programs comprising instructions for:
    performing a first lookup to obtain a network address for a chunk of data that contains at least a portion of requested content, the first lookup being based on a location-independent name associated with the chunk of data;

transmitting a request for the chunk of data, wherein the request specifies the network address;

receiving the chunk of data in response to the request, wherein the chunk of data is signed with a signature generated based on data in the chunk of data using a private key of a producer of the requested content;

performing a second lookup to obtain a public key associated with the private key, comprising accessing a ledger entry in a blockchain;

verifying the chunk of data using the public key; and in response to verifying the chunk of data, allowing an application running on the user device to use the data in the chunk of data.

9. The non-transitory computer-readable storage medium of claim 8, wherein the instructions for performing the second lookup include obtaining the public key from the ledger entry in the blockchain.

10. The non-transitory computer-readable storage medium of claim 8, wherein the instructions for performing the second lookup include:
   obtaining, from the ledger entry in the blockchain, a pointer to a network location at which the public key is stored; and
   obtaining the public key from the network location.

11. The non-transitory computer-readable storage medium of claim 8, wherein the instructions for performing the first lookup include transmitting a query to a name-resolution server system to obtain the network address and a transaction ID for the chunk of data, wherein the query specifies the location-independent name associated with the chunk of data and the ledger entry in the blockchain is indexed by the transaction ID.

12. The non-transitory computer-readable storage medium of claim 11, wherein the network address is an IPv6 address and the name-resolution server system stores a DNS registry and the instructions for performing the first lookup include querying the DNS registry.

13. The non-transitory computer-readable storage medium of claim 11, wherein the chunk of data is a first chunk, the network address is a first network address, the transaction ID is a first transaction ID, and the signature is a first signature, the instructions further include, instructions that cause, at the user device, operations to be performed, including:
   performing a third lookup to obtain a second network address and a second transaction ID for a second chunk of data;
   transmitting a request for the second chunk of data, wherein the request for the second chunk specifies the second network address;
   receiving the second chunk of data in response to the request, wherein the second chunk is signed with a second signature;
   performing a fourth lookup to obtain a public key specified in a ledger entry indexed by the second transaction ID in the blockchain;
   receiving an indication that the public key specified in the ledger entry indexed by the second transaction ID in the blockchain is not a current version of the public key for the second chunk of data; and
   in response to receiving the indication, discarding the second chunk of data.

14. The non-transitory computer-readable storage medium of claim 8, wherein the ledger entry, in the blockchain, includes a specification of the public key associated with the private key.

15. An apparatus comprising:
   a communication interface configured to enable network communications with a plurality of devices in a network; and
   a processor coupled with the communication interface, and configured to:
      perform a first lookup to obtain a network address for a chunk of data that contains at least a portion of requested content, the first lookup being based on a location-independent name associated with the chunk of data;
      transmit a request for the chunk of data, wherein the request specifies the network address;
      receive the chunk of data in response to the request, wherein the chunk of data is signed with a signature generated based on data in the chunk of data using a private key of a producer of the requested content;
      perform a second lookup to obtain a public key associated with the private key, comprising accessing a ledger entry in a blockchain;
      verify the chunk of data using the public key; and
      in response to verifying the chunk of data, allow an application running on the apparatus to use the data in the chunk of data.

16. The apparatus of claim 15, wherein the processor is configured to perform the second lookup by obtaining the public key from the ledger entry in the blockchain.

17. The apparatus of claim 15, wherein the processor is configured to perform the second lookup by:
   obtaining, from the ledger entry in the blockchain, a pointer to a network location at which the public key is stored; and
   obtaining the public key from the network location.

18. The apparatus of claim 15, wherein the processor is configured to perform the first lookup by transmitting a query to a name-resolution server system to obtain the network address and a transaction ID for the chunk of data,
   wherein the query specifies the location-independent name associated with the chunk of data, and
   the ledger entry in the blockchain is indexed by the transaction ID.

19. The apparatus of claim 18, wherein the network address is an IPv6 address and the name-resolution server system stores a DNS registry and the processor is configured to perform the first lookup by querying the DNS registry.

20. The apparatus of claim 18, wherein the chunk of data is a first chunk, the network address is a first network address, the transaction ID is a first transaction ID, and the signature is a first signature, the processor is further configured to perform operations of:
   performing a third lookup to obtain a second network address and a second transaction ID for a second chunk of data;
   transmitting a request for the second chunk of data, wherein the request for the second chunk specifies the second network address;
   receiving the second chunk of data in response to the request, wherein the second chunk is signed with a second signature;
   performing a fourth lookup to obtain a public key specified in a ledger entry indexed by the second transaction ID in the blockchain;

receiving an indication that the public key specified in the ledger entry indexed by the second transaction ID in the blockchain is not a current version of the public key for the second chunk of data; and in response to receiving the indication, discarding the second chunk of data.

\* \* \* \* \*